(12) United States Patent
Grady et al.

(10) Patent No.: US 6,220,240 B1
(45) Date of Patent: Apr. 24, 2001

(54) OUTDOOR FIREPLACE WITH EXTENDIBLE HANDLE

(75) Inventors: Jeffrey Grady, Naperville; John Grady, Lombard; Dave Henke, Hawthorn Woods; Kent Bach, Villa Park, all of IL (US)

(73) Assignee: Fleming Sales Company, Addison, IL (US)

( * ) Notice: Subject to any disclaimer, the term of this patent is extended or adjusted under 35 U.S.C. 154(b) by 0 days.

(21) Appl. No.: 09/495,413

(22) Filed: Jan. 31, 2000

(51) Int. Cl.[7] ............................. F24B 1/181; A45C 13/26
(52) U.S. Cl. ....................... 126/519; 126/500; 126/276; 16/429
(58) Field of Search .................................. 126/519, 500, 126/9 R, 9 B, 38, 41 R, 25 R, 276; 16/429, 405

(56) References Cited

U.S. PATENT DOCUMENTS

| | | |
|---|---|---|
| D. 284,929 | 8/1986 | Schlosser et al. . |
| 353,147 | 11/1886 | Lederle . |
| 375,347 | 11/1996 | Whallen et al. . |
| 1,202,601 * | 10/1916 | Snyder ................................... 16/429 |
| 2,174,824 | 10/1939 | Frank . |
| 2,619,951 | 12/1952 | Kahn ................... 126/25 R |
| 2,867,208 * | 1/1959 | True et al. ............................. 126/276 |
| 2,900,897 * | 8/1959 | Fisher ..................................... 126/9 B |
| 3,096,706 | 7/1963 | Cardwell ............................ 126/25 A |
| 3,421,433 | 1/1969 | Vitale .................. 126/25 R |
| 3,452,736 | 7/1969 | Harff et al. .......................... 126/9 R |
| 3,556,076 | 1/1971 | Stewart ................................. 126/9 R |
| 3,611,915 | 10/1971 | Glaser .................................. 126/25 R |
| 3,874,531 * | 4/1975 | Mayo ...................................... 414/680 |
| 4,210,118 | 7/1980 | David et al. ......................... 126/25 R |
| 4,233,890 | 11/1980 | Jansen ................................... 126/276 |
| 4,535,749 | 8/1985 | Schlosser et al. .................... 126/9 R |
| 4,553,525 | 11/1985 | Ruble ....................................... 126/30 |
| 4,706,817 | 11/1987 | Greathouse .......................... 126/9 B |
| 4,885,988 * | 12/1989 | Lee ....................................... 126/9 R |
| 5,318,322 | 6/1994 | Home ..................................... 126/9 R |
| 5,529,053 | 6/1996 | Carter et al. ........................ 126/25 R |
| 5,598,834 * | 2/1997 | Grady ................................... 126/276 |
| 5,809,616 * | 9/1998 | Porter, Sr. .............................. 16/429 |
| 5,832,915 | 11/1998 | Skidmore et al. .................... 126/9 R |
| 5,960,788 | 10/1999 | Bach et al. ............................ 126/519 |

* cited by examiner

Primary Examiner—Ira S. Lazarus
Assistant Examiner—Josiah C. Cocks
(74) Attorney, Agent, or Firm—Vedder, Price, Kaufman & Kammholz

(57) ABSTRACT

An outdoor fireplace has an extendible handle that is extendible between two positions so that the fireplace may be easily moved. The handle includes first and second handle members that telescopingly engage each other and which are maintained at an angle with respect to the ground by way of their attachment to the firebowl member of the fireplace. In one position, the handle members are maintained in a collapsed position such that the handle does not extend too far from the firebowl member and serve as an impediment to movement around the fireplace. In the other, extended position, the handle members are extend within each other and the gripping portion of the handle is moved significantly away from the firebowl so that the fireplace may be easily moved without the user being close to the fireplace.

24 Claims, 5 Drawing Sheets

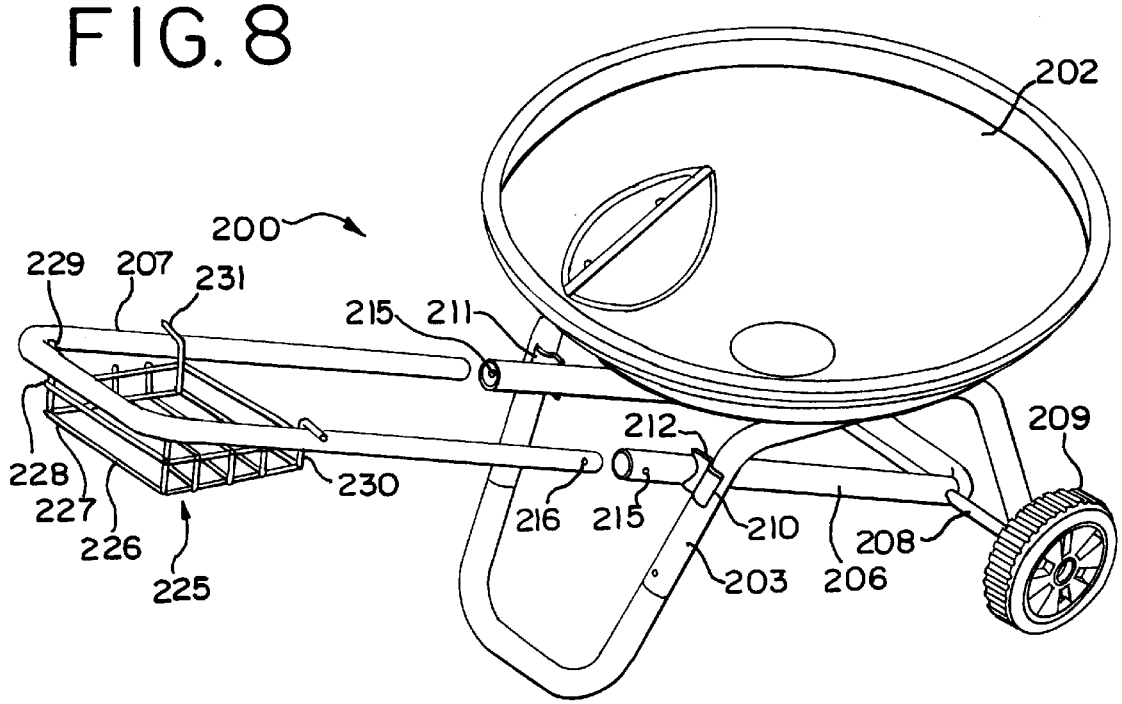
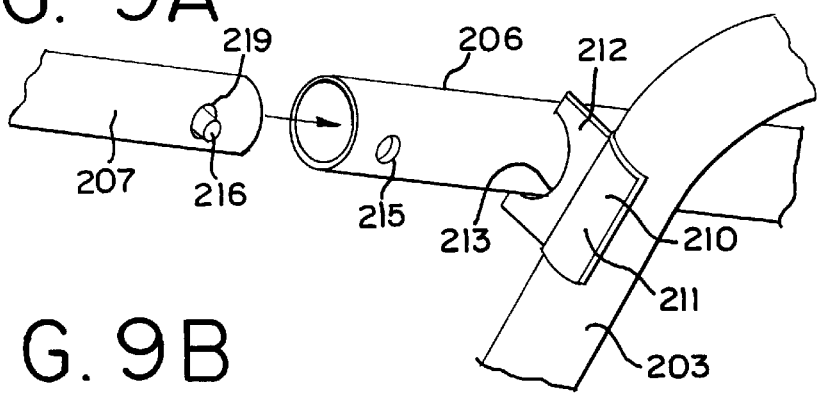
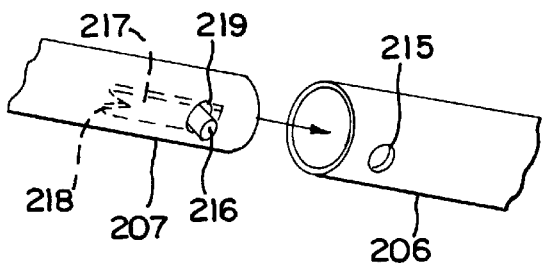
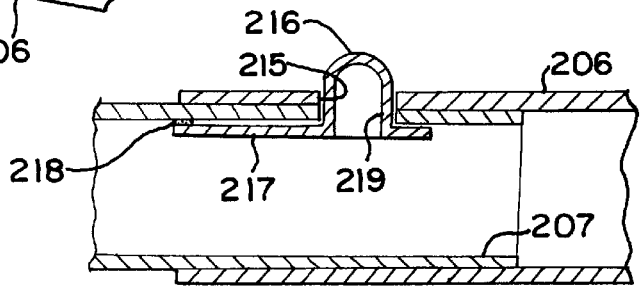

OUTDOOR FIREPLACE WITH EXTENDIBLE HANDLE

BACKGROUND OF THE INVENTION

The present invention relates generally to portable fireplaces and, more particularly, to a portable outdoor fireplace with a fire screen assembly and a handle that permits easy and ergonomically efficient transport of the fireplace.

Fixed outdoor fireplaces such as those made of brick and stone have been known and have been popular for years. Despite the popularity of these fixed fireplaces, portable fireplaces intended for outdoor use have entered the market in the past few years. Their size is small as compared to fixed fireplaces and their structures are such that they permit them to be easily moved from one location to the other. These fireplaces are found in the literature in U.S. Design Pat. No. Des. 293,191 issued to Weber-Stephen Products and describes a portable outdoor fireplace. Handles are positioned on the sides of this outdoor fireplace to assist a user in moving it. They are located in an awkward location, generally along the edge of the top or bottom members of the fireplace, where they require a user to get close to the fireplace to grasp them for moving purposes.

Another outdoor fireplace is sold under the trade name "FIREPIT" by Whalen Manufacturing of Macomb, Ill., and is described in U.S. Pat. No. 5,596,980, issued in 1997. The fireplace described in this patent has a pair of wheels mounted to a pair of legs so as to render it easily movable, but it has a handle fixed to its bottom fire bowl. Like the aforementioned Weber fireplace, this handle is fixed at an awkward level where a user must bend over uncomfortably to grab hold of it to move the fireplace. The user also has to get close to the fireplace to move it.

Applicant's own fireplaces that are described in U.S. Pat. No. 5,836,298, issued November 1998 and U.S. Pat. No. 5,960,788, issued October 1999, both include similar handles that are affixed to the bottom fire bowl of the fireplace. These handles are spaced close to the edge of the bottom fire bowl where the user may become exposed to the heat given off by the fireplace. The location of these and other handles in the prior art is not ergonomically efficient in that it forces a user to bend over uncomfortably in order to grab hold and move the fireplace.

The prior art therefore lacks a fireplace with a handle that is spaced apart from the fire bowl of the fireplace and which is ergonomically designed to alleviate awkward bending when utilizing the handles.

SUMMARY OF THE INVENTION

The present invention is therefor directed to a portable fireplace having a fire chamber defined between top and bottom cover members and an extendible handle assembly that facilitates the transport of the fireplace without interfering with its operation.

It is therefore a general object of the present invention to provide a portable fireplace having a handle disposed on the fireplace in a location that facilitates transport of the fireplace and which is ergonomically disposed to alleviate back stress of a user.

It is yet another object of the present invention to provide a wheeled fireplace having opposing base and cover portions that maintain a fire screen assembly in place, the base portion having a handle assembly associated therewith, the handle assembly extending upwardly from the base portion at an angle and being extendible between a transport position and an operation position, the handle being oriented at a preselected angle with respect to the ground so as to alleviate the need of a user to excessively bend over in order to grasp the handle and move the fireplace.

A still further object of the present invention is to provide a portable outdoor fireplace having a handle associated therewith that is movable between two positions, the first of these positions being a transport position wherein the handle of the handle assembly is extendible from the fireplace at a preselected angle with respect to the ground and extends upwardly from the grill for a distance past the base portion of at least one half a diameter of the grill, the second of these positions being an operating position wherein the handle is collapsed upon itself to a position proximate to the base portion, but not extending past the base portion a sufficient extent to present an impediment to movement of people around the fireplace.

Yet a further object of the invention is to provide a telescoping handle assembly for use with a portable fireplace, the handle assembly having a pair of hollow tubes forming attachment members for attachment to the base portion of the fireplace and a C-shaped member that telescopingly engages the attachment members so that it is extendible between at least two operative positions.

Still yet another object of the present invention is to provide a handle assembly for converting an outdoor fireplace having a "static" handle to one having a "dynamic" handle that is extendible between at least two operative positions.

The present invention accomplishes these objects by way of its novel and unique structure and in accordance with one principal aspect thereof and as exemplified by the preferred embodiment, an elongated handle assembly is provided for attachment to the fireplace. The handle assembly is attached to the fireplace at two different locations and relative heights so that the handle extends at an angle from the fireplace. The handle assembly includes at least two co-acting members that engage each other in a sliding engagement.

In the preferred embodiment, this sliding engagement is a telescoping engagement where one member slides within the other member between two positions. In one position, the handle members are collapsed together and the handle merely protrudes a short distance from the fireplace bottom fire bowl member. In the other, extended position, one of the handle members extends out of the other member and projects a sufficient distance from the fire bowl to facilitate the moving and transport of the fireplace.

The handle members may include means for maintaining them in engagement, such as inwardly pressed, or punched tabs, that slide over each other when assembled, but which interfere with each other to prevent disassembly of them from their combined position. The engagement means are also preferably selectively operable so that they may be actuated by a user to engage the two handle members in their extended position, or to permit the two handle members to be collapsed upon each other.

These and other objects, features and advantages of the present invention will be clearly understood through consideration of the following detailed description.

BRIEF DESCRIPTION OF THE DRAWINGS

In the course of this description, reference will be made to the attached drawings in which:

FIG. 8 is a perspective view of an alternate embodiment of the invention;

FIG. 9A is an enlarged detail view of the handle member connection shown in FIG. 8 at "B";

FIG. 9B is a similar view as FIG. 9A, but illustrating an alternate handle member engagement means; and, FIG. 9C is a sectional view of the engagement means of FIG. 9B, but with the two handle members engaged together.

DETAILED DESCRIPTION OF THE PREFERRED EMBODIMENTS

Figure 1:
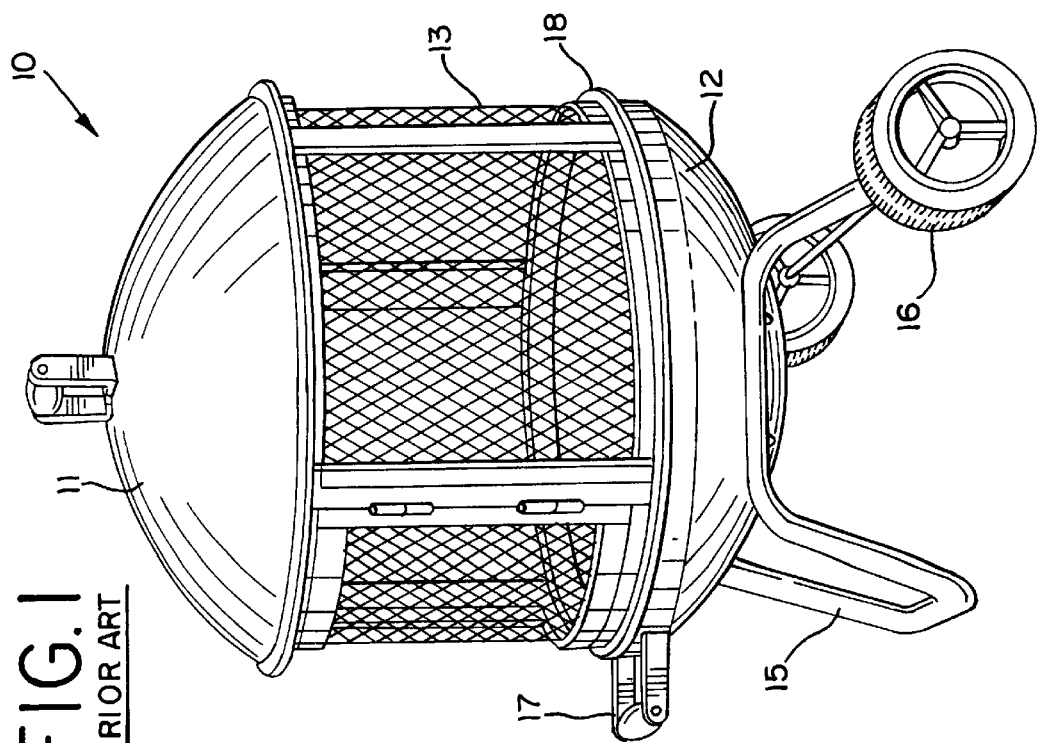
FIG. 1 is an elevational view of a known outdoor fireplace that is distributed by applicant.

FIG. 1 illustrates an outdoor fireplace of a known type distributed by applicant under the trade name "Lil Camper" that is representative of prior art outdoor fireplace constructions, and which is described in detail in U.S. Pat. No. 5,960,788, issued Oct. 5, 1999. This fireplace 10 can be seen to have a top cover member 11, a bottom fire bowl member 12 and a screen assembly 13 that extends between the two members 11, 12 and defines a fire chamber into which combustible material is placed for burning. The fireplace 10 further may have a base portion 15 that uses wheels 16, or legs, to support the bottom member 12 off of the ground and to facilitate movement of the fireplace.

This fireplace 10 includes a short handle 17 that is mounted near the outer edge 18 of the bottom member 12 and extends outwardly from the edge 18. Although this handle 17 permits a user of the fireplace 10 to grasp it and move the fireplace, it is nevertheless located at an awkward location where the user is forced to bend over significantly to grasp and lift the handle 17. In this position, the user must lift the front end of the fireplace by the handle 17, so that he may lift the front legs slightly off of the ground so that the fireplace may be moved by its wheels 16. As mentioned before, this position stresses the user's back. The handle 17 is somewhat close to the outer edge of the bottom member and to the screen assembly 13.

The present invention is directed to a fireplace that overcomes this shortcoming and provides an improved handle assembly for an outdoor fireplace that is extendible between at least two operative positions to facilitate the movement and operation of the fireplace. The handle may be extended to a point spaced significantly from the outer edge of the bottom member where the user does not have to bend over significantly and where the handle may be collapsed to a point where it does not significantly extend past the outer edge so as to present an impediment to movement around the fireplace.

Figure 2:
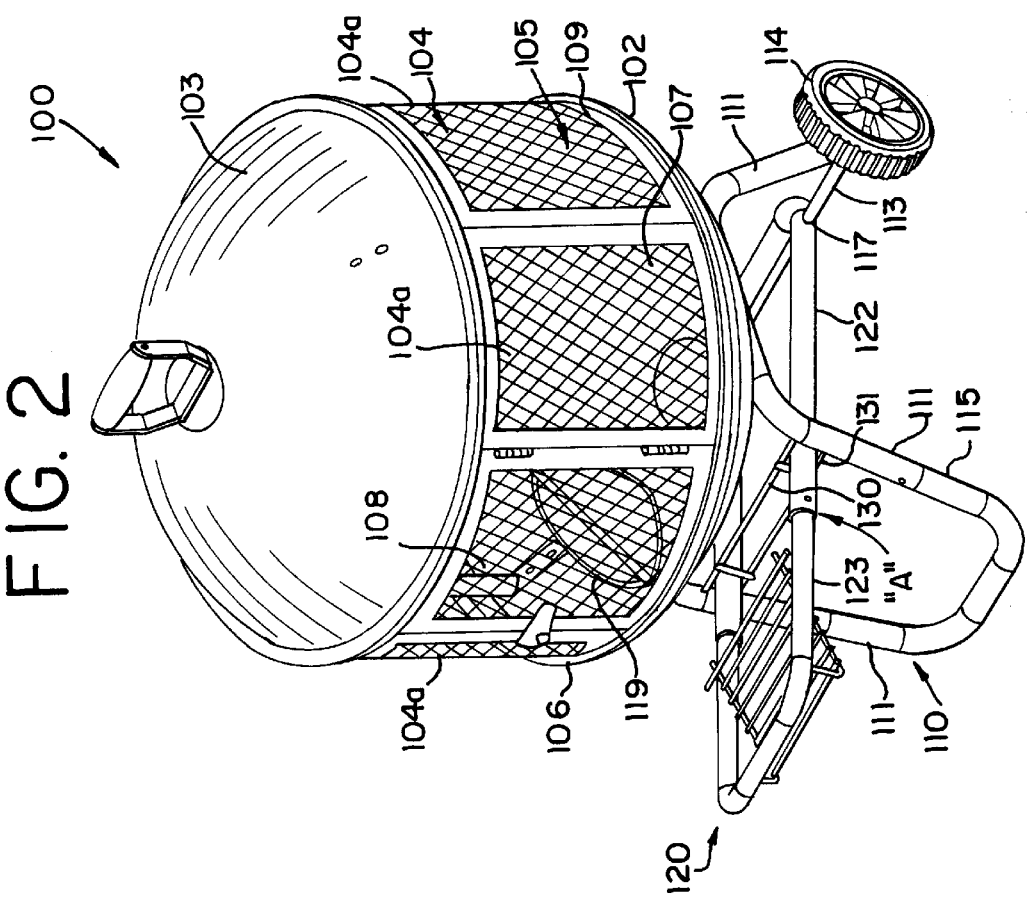
FIG. 2 is a perspective view of an outdoor fireplace constructed in accordance with the principles of the present invention having an extendible handle that facilitates the movement of the fireplace but does not interfere with the operation of the fireplace.

FIG. 2 illustrates an outdoor fireplace 100 constructed in accordance with the principles of the present invention. It can be seen that the fireplace 100 has a bottom member 102 and a top member 103, each of which have outer edges that preferably mate together so that the fire chamber 105 of the fireplace may be completely enclosed in order to shut off the flow of air to a fire therein. A screen assembly 104 is provided that stands upwardly on the bottom member 102 and which encloses the fire chamber with a screened enclosure. The fire screen assembly may be supported on the bottom member 103 by the member itself, or it may rely upon brackets or other hardware. The top and bottom members 102, 103 and the screen assembly 104 have as shown, a circular or cylindrical configuration so that the screen assembly 104 fits within the outer edges 106 of the top and bottom members 102, 103. Combustible material may be placed within the hollow interior 107 of the bottom member 102 and within the screen assembly 104 and lit to form a fire. The top member 103 provides a cover to the screen assembly 104. The screen assembly 104 may be formed from a series of screen components 104a, as illustrated, or it may be formed as a continuous structure. The screen assembly 104 may include a hinged door 108 thereon which may also be screened so that a user may gain access to the fire chamber without taking off the top member 103. The door 108 preferably has a height that is less than the distance separating the top and bottom members 102, 103 together so that it may be opened and closed without interference from the top and bottom members 102, 103.

The fireplace 100 further has a base 110 that serves to support the fireplace 100 off of the ground and may include, as illustrated, one or more legs 111 that in turn retain an axle 113 to which is mounted a pair of wheels 114. The legs 111 are shown as tubular members 115, but other suitable members, such a metal strips, may be used in place thereof. The wheels 114 may also be separately mounted to each of the legs 111, rather than interconnected by means of an axle 113. Similarly, the legs 111 of the base 110 may include skid portions or other structures that will permit the fireplace 100 to be moved along the ground. The legs 111, axle 113 and wheels 114 may be considered to cooperatively define an undercarriage of the fireplace 100 which is preferably attached to the bottom member 102 by way of a suitable connection. In the embodiment illustrated, the legs 111 are attached to the bottom member 102 by way of bolts, and the legs 111 are received within and attached to the bottom member 102 at a pair of recesses 119 formed in the bottom member 102. The bottom member 102, as illustrated, is deep and hollow and forms, in effect at least part of a fire bowl for the fireplace 100.

Figure 4:
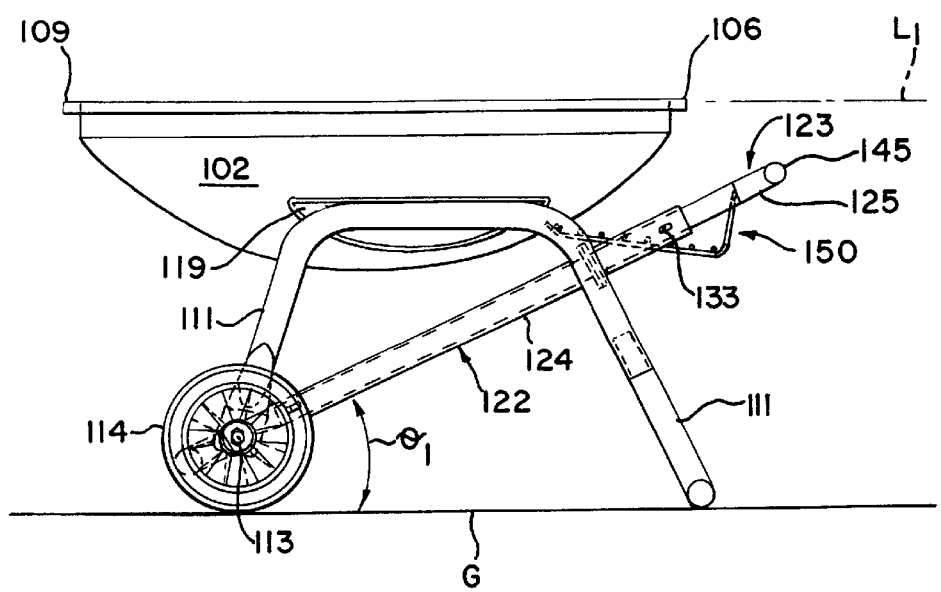
FIG. 4 is an elevational view of the base portion of the fireplace of FIG. 2, and illustrating the handle of the fireplace collapsed into a recessed, or operating and storage position.

In an important aspect of the present invention, a handle assembly 120 is associated with the fireplace 100. The handle assembly 120 includes, as illustrated, at least one pair of co-acting members, that are shown in the preferred embodiment as hollow, first and second tubular members 122, 123 that slidingly engage each other. These handle members 122, 123 are disposed at an angle $\ominus_1$ with respect to the ground G or with respect to an imaginary line $L_1$ that is drawn across the rim 109 of the outer edges 106 of the bottom member 102. (FIG. 4.)

In the embodiment illustrated, the handle members 122, 123 are tubular in cross-section and are provided as complete U-shaped members having two leg portion 124, 125 that are interconnected by associated bight portions 126, 127. Although shown as complete handle members, it will be understood that the handle members may be formed from a plurality of separate components, such as the leg portions and crosswise bight portions. The tubular leg portions 124, 125 are hollow and have different diameters. The leg portions 124 of the first handle member 122, shown as the lowermost one in the drawings, are slightly larger in their diameter $D_1$ or overall size, than the diameter $D_2$ of the leg portions 125 of the second, or uppermost handle member 123 so that the leg portions of one of the handle members slides within the leg portions of the other handle member. This sliding engagement is shown as a telescoping engagement in the preferred embodiment and it will be understood that the first handle member 122 may slide within the second handle member 123 as well to obtain the same results. Other means of sliding engagement are also contemplated and will be within the scope of the invention.

Figure 3:
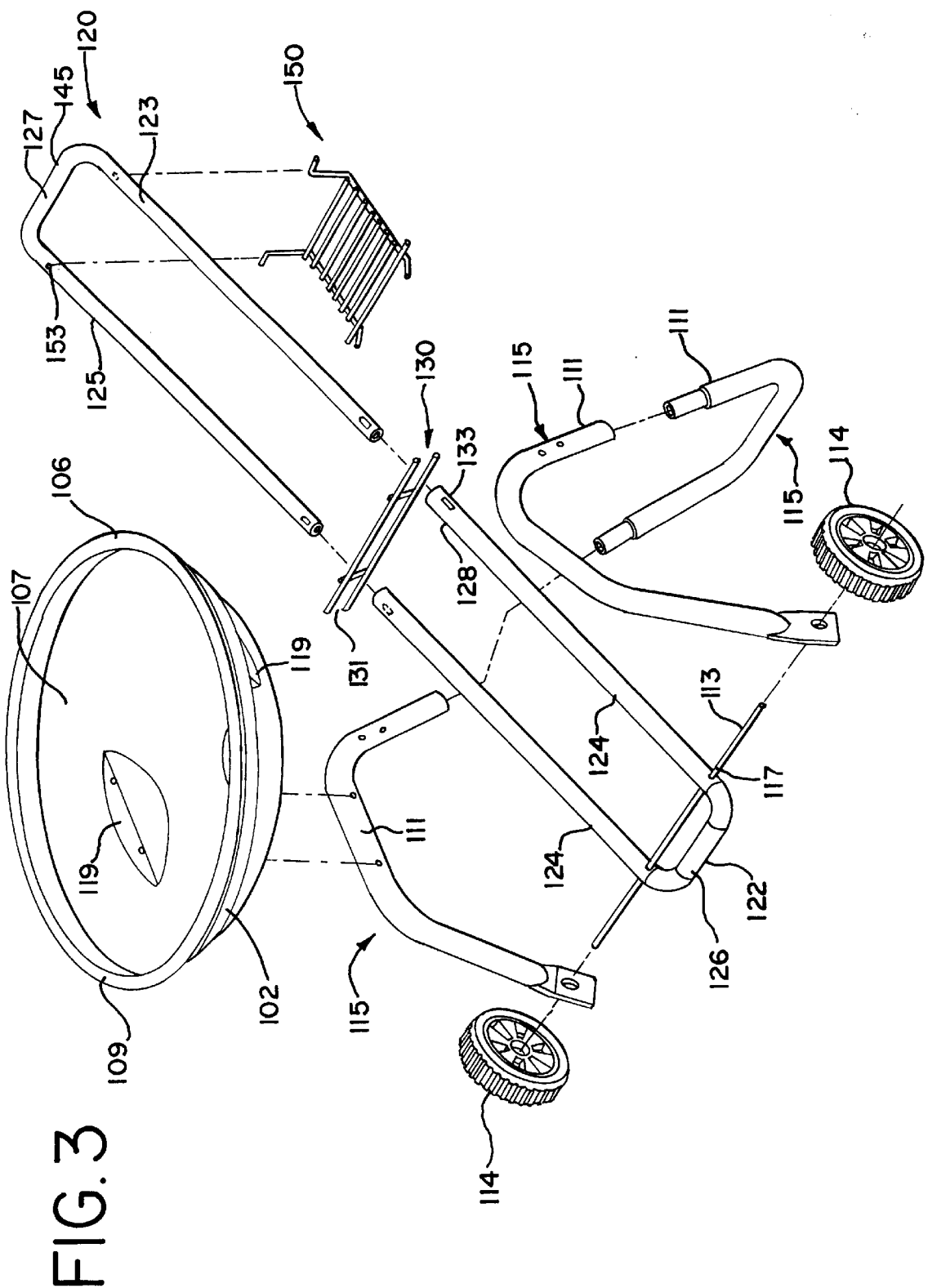
FIG. 3 is an exploded view of the bottom member, the base and handle assembly of the fireplace of FIG. 2.

The first handle member 122 is first attached to the fireplace 100 by way of the axle 113 that interconnects the legs 111 of the base 110 together, by way of holes 117 formed therein through which the axle 113 passes. A second point of attachment is provided at a level above and away from the first point of attachment. This attachment is shown best in FIGS. 2 & 3, where a cross member 130 is provided and extends between the legs 111 of the base 110. The cross member 130 is slotted and the first handle member leg portions 124 extend through the slots, or passages 131, formed therein at the specific angle $\Theta_1$.

The handle member leg portions 124, 125 have respective free ends 128, 129 that may include means for maintaining the handle members 122, 123 together in engagement. Referring to FIG. 7, one of the handle members 122, may have a portion punched or stamped in one or both of its leg portions 124 to form an inwardly extending tab 133 which extends inwardly at an angle and which terminates in an end portion or stop surface 134 that faces axially in one direction $B_1$ within the hollow interior of the leg portion 124. The other handle member 123 also has a portion of it punched to form a like tab 135 with a stop surface 136 that also extends axially inwardly into the hollow interior of the leg portion 125 and which faces in an opposite direction $B_2$ to the stop surface 134.

Figure 7A:
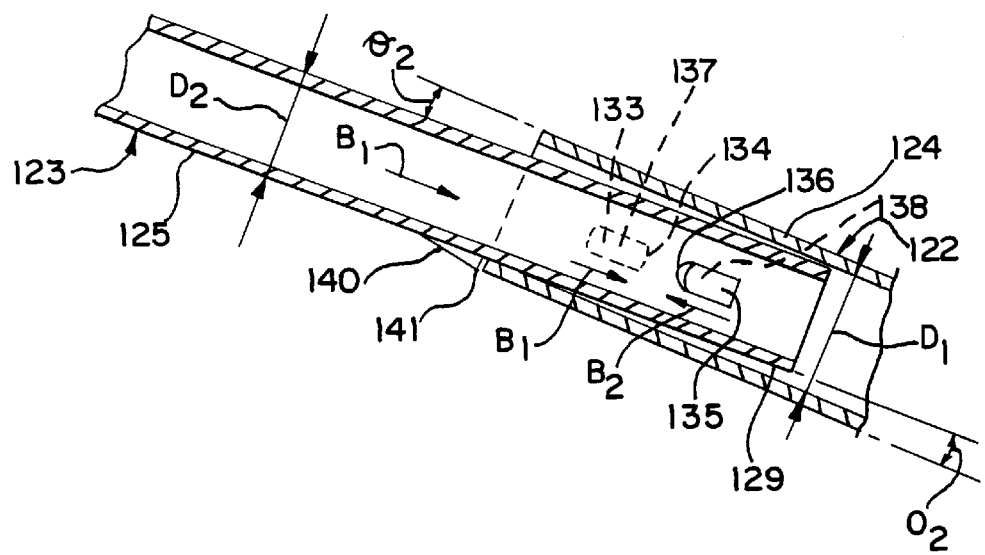
FIG. 7A is an enlarged detail view of the handle of the fireplace of FIG. 2, taken at area "A" thereof and illustrating engagement and locking means formed as part of the handle structure.
Figure 7B:
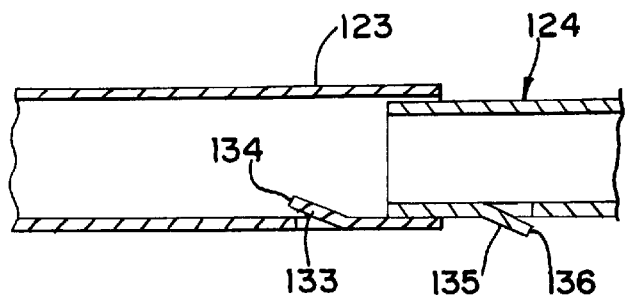
FIG. 7B is an enlarged detail view of FIG. 7A showing the manner of engagement of the locking means.

These two stop surfaces 134, 136 prevent the separation of the two handle members 122, 123 after they become fully engaged with each other. Each of the tabs 133, 135 extend inwardly at a slight angular orientation so that the body portions 137, 138 of the tabs 133, 135 are inclines and act as ramps which will engage each other so that the two handle members 122, 123 may be easily coupled together. The stop surfaces, as shown in FIG. 7B, thereby provide a "one-way" structure that remains together after assembly by the user. It also prevents the handle assembly from coming apart during use. Because of the difference in size of the handle member leg portions 124, 125 with the first member 122 being slightly larger than the second member 123, the inner handle member 123 will slightly depress down when fully extended anywhere in the range from between about 2° to about 10° along a second angle $\Theta_2$. In order to maintain the handle in its extended position (FIG. 5), the second member 123 may have an additional engagement member disposed thereon, which is shown in the embodiment of FIG. 7A as an outwardly extending tab 140 that has a free end 141 that faces in an axial direction toward the first member 122, or along $B_1$. This free end 141 acts as a stop surface that engages the outer edge 143 of the first handle member free end 128. This engagement maintains the handle in its extended position. A user can lift the second member 123 to free the tab stop surface 141 from the second handle member edge 143 and slide the second handle member 123 back into the first handle member 122.

Figure 5:
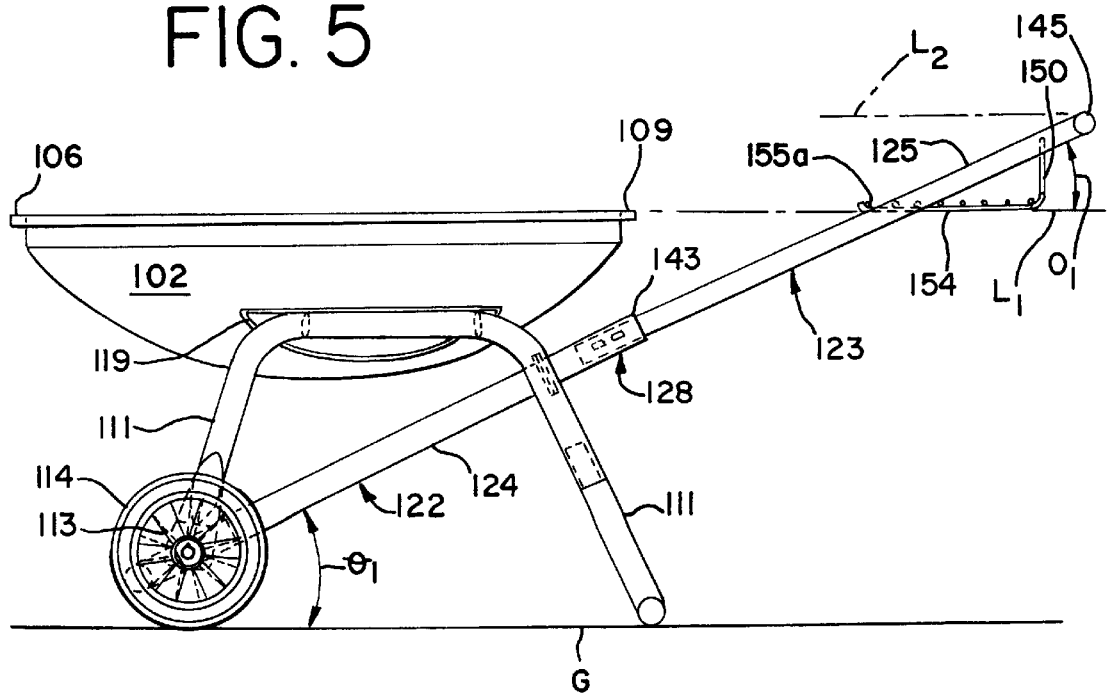
FIG. 5 is a view similar to FIG. 4, but illustrating the handle of the fireplace extended into a moving position.

In actual operation, it has been found that a length of approximately 25 inches is sufficient for both of the first and second handle members 122, 123 and will provides suitable results. With these and other dimensions, when the handle is in a collapsed position, such as is illustrated in FIG. 4, the operative end 145 of the handle assembly 120 is in a position that is relatively close to the bottom member 102 and is distanced from the bottom member 102 approximately the same distance as the "static" handle 17 of the prior art fireplace of FIG. 1, or about 3 to 4 inches. In the extended position, as shown in FIG. 5, the entire handle assembly has an overall length of about 48 inches, or about 90% greater than the length of the handle members 122, 123. When extended, the operative end 145 of the handle is disposed away from the bottom member and preferably above the rim 109 of the outer edges 106 of the bottom member 102. Most preferably, the handle extends along a path (or imaginary line) that intersects the imaginary line $L_1$ of the outer edge rim 109. The handle projects approximately 20 inches above the ground G at a level $L_2$ which is above the rim 109 of the bottom member 102. This is preferably above the level $L_1$, the distance to the rim of the fireplace 100, which is about 18 inches. The operative end 145 of the handle also further projects approximately 20 inches past the outer edge 106 of the bottom member 102 in a generally outward, or radial direction therefrom. This extended distance permit the user to tilt up the fireplace in use and move it. The handle in effect acts as a lever with a long lever arm that facilitates the movement of the fireplace.

Figure 6:
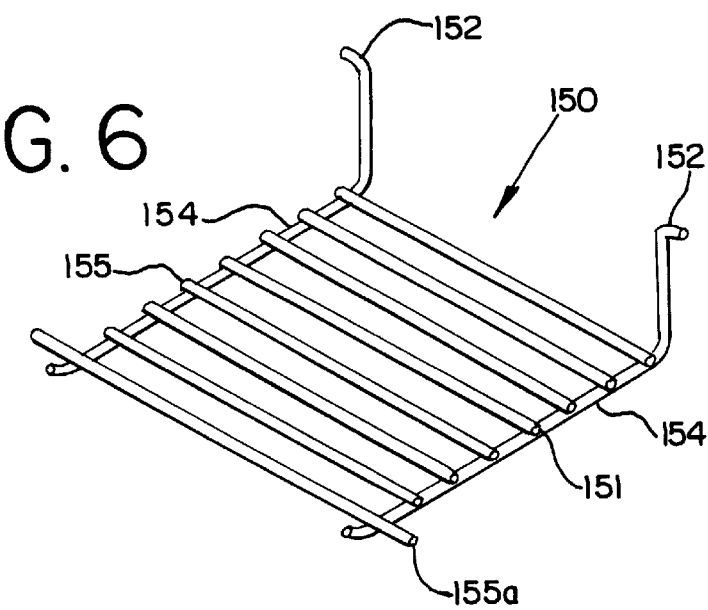
FIG. 6 is a perspective view of a shelf that may be utilized with the fireplace of FIG. 2.

The handle assembly may also include a shelf 150 which may accommodate utensils, plates and other items of the user. The shelf 150, as best shown in FIG. 6, includes a wire framework 151 that is formed by wire and includes two elongated rail portions 154. The rail portions 154 have free ends 152 that engage the upper handle member 123 by extending sideways to fit within holes 153 formed in the upper handle member 123 near the operative end 145 thereof. A series of cross members 155 provide the shelf with lateral support for various items. One of the cross members 155a extends longer sideways to rest upon the outer surface of the upper handle member 123. The framework 151 of the shelf 150 has an angular configuration, shown generally in FIG. 6 as an L-shaped configuration (or about a right angle), with the engagement ends 152, 155a being at different elevations.

It will be appreciated that the present invention may be integrated into a fireplace and sold as a unit as well as an aftermarket "kit of parts" that can be used for converting an existing fireplace, such as that shown in FIG. 1, into one with an extendible handle as shown in FIG. 2. This may be accomplished by drilling holes in the legs 111 to accommodate the cross support member 130 therebetween. The axle 13 can be threaded through the lower end of the first handle member 122 and the second handle member 123 inserted into the first handle member 122.

FIG. 8 illustrates an alternate embodiment 200 of the present invention, and it is seen to include a firebowl member 202 with an undercarriage assembly 203 supporting the firebowl member 202 off the ground. A handle assembly 205 includes two engaging members 206, 207 with the tone member 206 being drilled to accommodate the axle 208 of the undercarriage 203 so that the handle member 206 fits within the undercarriage 203 preferably (between the leg members thereof) and do not interfere with the operation of the wheels 209.

As shown best in FIG. 9A, the one handle member 206 is attached to the legs of the undercarriage 203 by way of a bracket 210. The bracket 210 may be stamped, or otherwise formed from a metal plate and may include a curved flange 211 and a slotted flange 212. The curved flange 211 can be attached to the undercarriage 203 by welding it or bolting it thereto, or by other suitable means. The slotted flange 212 includes a slot 213 formed therein that receives the handle member 206. In the embodiment shown, the slot 213 is curved and preferably has a diameter that matches that of the handle member 206. This is one alternate way of holding the handle member 206 in its preferred angular position with respect to the ground and also the rim of the firebowl, and it will be understood that other means of attachment will fall within the scope of this invention.

FIGS. 9A–C also illustrate another manner of retaining the two handle members 206, 207 in place. This manner of retention includes a registration opening 215 formed in the one handle member 206 and a biased member, shown in the form of a locking stud 216 that is formed with a tab member 217 and which extends outwardly from the other handle member 207 through its own opening 219. In the embodiment illustrated, the extending stud 216 is formed at the end of the tab member 217, while the other end 218 of the tab member 217 is in contact with the inner walls of the handle member 207 such as by welding, frictional contact or the like that enables the stud to be depressed and have some outward spring action to effect the locking action with the handle member 206. Due to this locking action, when the stud 216 is depressed, the other handle member 207 may be slid fully within the one handle member 206 for a sufficient distance. When the other handle member 207 is pulled out from its nested arrangement, the stud 216 will locate the registration opening 215 of the one handle member 206 and protrude through it as will be appreciated by one skilled in the art. The handle members 206 and 207 are then locked together in engagement with each other.

FIG. 8 also illustrates an alternate shelf assembly 225 in which the shelf portion 226 is incorporated as part of a basket 227. The principles of attachment remain the same in that two arms 228 of the basket 227 will engage the handle member 207 such as by extending into holes 229 formed therein, while the other arms 230 of the basket are formed with extending ends 231 that will lie upon the outer surfaces of the handle member 207. The shelf portion 226 changes its elevation in response to the movement of the handle member 207 relative to the firebowl. It may also be pivoted around it s arms 228 somewhat over the center part of handle member 207 to empty its contents for cleaning purposes.

While the preferred embodiments of the invention have been shown and described, it will be appreciated by those skilled in the art that changes and modifications may be made to these embodiments without departing from the spirit of the invention, the scope of which is defined by the appended claims. For example, sliding channel members may be used in place of the tubular handle members described so long as a sliding engagement is maintained. And, other means of engaging the handle members together may be used such as two handle members that are otherwise linked together may accomplish the same function and purpose. The fireplace need not have wheels, but may include skids or flat surfaces on the legs, and the configuration of the fireplace need not be circular.

We claim:

1. An outdoor fireplace, comprising:
    a base member for supporting and burning combustible material therein, the base member having an outer edge of a predetermined configuration;
    a fire screen assembly supported by said base member for containing and substantially encloses said combustible material within said base member,
    a cover member for covering a top portion of said fire screen assembly;
    a handle associated with said base that is extendible between at least first and second operative positions, the handle including at least two handle members that cooperatively engage each other, a first of said handle members being attached to said fireplace and a second of said handle members being extendible from said first handle member, said first handle member being disposed close to said base member in said handle first operative position and away from said base member in said handle second operative position; and,
    a shelf associated with said second handle member and positioned thereon such that an elevation of said shelf changes with movement of said second handle member.

2. The outdoor fireplace as defined in claim 1, further including a wheeled undercarriage that supports said base member off of the ground, and said handle first member engages at least said undercarriage.

3. The outdoor fireplace as defined in claim 1, wherein said fire screen assembly includes a door for entry to an interior portion of said fire screen assembly from outside of said fireplace.

4. The outdoor fireplace as defined in claim 1, wherein said first and second handle member include U-shaped members.

5. The outdoor fireplace as defined in claim 1, wherein said handle members telescopingly engage each other, such that one of said handle members fits within the other of said handle members.

6. The outdoor fireplace as defined in claim 1, wherein in said handle first operative position, said handle second member is disposed beneath an imaginary line drawn across said based member outer edge and in said handle second operative position, said handle second member at least contacts said imaginary line.

7. The outdoor fireplace as defined in claim 6, wherein in said second operative position, said handle second member extends at least partially past said imaginary line.

8. The outdoor fireplace as defined in claim 1, wherein said handle members include locking members formed thereon for retaining said handle members together in said handle second operative position.

9. The outdoor fireplace as defined in claim 8, wherein said locking members include at least one locking stud associated with one of said two handle members and an opening associated with the other of said two handle members, said locking stud being at least slightly biased so as to be received in said opening when said handle members are in said handle second operative position.

10. The outdoor fireplace as defined in claim 1, wherein said first handle member is attached to said fireplace such that it extends at an angle with respect to the ground upon which said fireplace rests.

11. The outdoor fireplace as defined in claim 10, further including a cross member extending crosswise with respect to said handle, said cross member at least partially supporting said first handle member.

12. The outdoor fireplace as defined in claim 10, further including at least one bracket associated with said fireplace, the bracket engaging said first handle member and supporting it in an angular orientation with respect to the ground upon which said fireplace rests.

13. The outdoor fireplace as defined in claim 1, wherein said shelf includes first and second means for engaging said second handle member, the shelf first engaging means including two free ends that extend into said second handle member in a manner to permit movement of said shelf relative to said second handle member, and the shelf second engaging means includes two free ends that rest upon an outer surface of said second handle member.

14. An outdoor fireplace, comprising:

a hollow, fire bowl member for supporting and burning a combustible material therein, the fire bowl member having an interior space defined by an outer edge;

an undercarriage for supporting said fire bowl member off the ground, the undercarriage including a pair of members mounted to said fire bowl member, each of the undercarriage members having a general u-shape with a base portion and two downwardly depending leg portions, said undercarriage members being spaced apart from each other and mounted to an underside of said fire bowl member, said undercarriage further including a wheel rotatable mounted to each of the leg portions; and, a handle with a gripping portion for grasping by a user and transporting the fireplace from one place to another, the handle being supported on said undercarriage at two points of attachment beneath said fire bowl member such that said handle extends upwardly at an angle with respect to said ground, and said handle further being operable between at least first and second operative positions, wherein, in said first operative position, said handle has a first preselected length and said handle gripping portion is located proximate to said fire bowl member outer edge such that it does not interfere with a user of said fireplace walking around said fireplace, and in said second operative position, said handle has a second preselected length that is greater than said first preselected length, whereby said handle gripping portion is spaced farther from said fire bowl outer edge than when said handle to facilitate movement of said fireplace by said user.

15. The fireplace of claim 14, wherein said undercarriage includes an axle extending between said undercarriage leg members and said handle includes first and second handle members, said first handle member further having opposite ends, one end of which is attached to said undercarriage by being operatively interconnected to said axle between said undercarriage leg members.

16. The fireplace of claim 15, wherein an opposite end of said handle first member is attached to said undercarriage by operatively engaging said undercarriage leg members at an elevation above said axle such that said first and second handle members are maintained at an angle with respect to an imaginary line drawn across said outer edges of said fire bowl member.

17. The fireplace of claim 14, wherein said handle includes first and second handle members, each of the first and second handle members having a general U-shape with leg portions interconnected together by respective end portions, the end portion of said second handle member including said gripping portion.

18. The fireplace of claim 15, wherein said first and second handle members telescopingly engage each other.

19. The fireplace of claim 14, wherein said handle includes two handle members, one of said two handle members being slidable relative to the other of said two handle members.

20. The fireplace of claim 17, wherein each of said first and second handle members include opposing stop surfaces that engage each other to maintain them together as a handle.

21. The fireplace of claim 14, further including a shelf supported on said handle, said shelf having a level surface for holding items thereon, said shelf being disposed near said handle gripping portion such that its position relative to said fire bowl member changes when said second handle member is extended into said second operative position.

22. The fireplace of claim 18, wherein said first and second handle members include stop members that maintain said handle members in said telescoping engagement.

23. A handle assembly for converting an outdoor fireplace having a base member which holds combustible material for burning and a support structure for holding the base member off the ground into a fireplace with an extendible handle, the handle assembly comprising: first and second handle members, first attachment means associated with said first handle member for engaging said fireplace support structure beneath said base member, proximate to one end of said first handle member, second attachment means associated with said first handle member for engaging said fireplace beneath said base member proximate to an opposite end of said first handle member, means for maintaining said first and second handle members in sliding engagement with respect to each other such that one of said first and second handle members may be slid outwardly with respect to the other of said first and second handle members from a collapsed position to an extended position, and said first and second attachment means cooperating cooperating to support said fireplace at an angle to the ground.

24. The handle assembly of claim 23, wherein said first and second handle members include U-shaped hollow tubes that telescopingly engage each other, said first and second handle members including cooperating means for maintaining said first and second handle members in engagement with each other in said extended position.

* * * * *